US011107640B2

(12) United States Patent
Raman et al.

(10) Patent No.: US 11,107,640 B2
(45) Date of Patent: *Aug. 31, 2021

(54) ELECTROLYTE FORMULATIONS FOR ENERGY STORAGE DEVICES

(71) Applicant: Maxwell Technologies, Inc., San Diego, CA (US)

(72) Inventors: Santhanam Raman, San Diego, CA (US); Xiaomei Xi, Carlsbad, CA (US); Xiang-Rong Ye, San Diego, CA (US); Jian Hong, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/370,296

(22) Filed: Mar. 29, 2019

(65) Prior Publication Data
US 2019/0362909 A1 Nov. 28, 2019

Related U.S. Application Data

(63) Continuation of application No. 15/442,080, filed on Feb. 24, 2017, now Pat. No. 10,249,449.
(Continued)

(51) Int. Cl.
*H01G 11/50* (2013.01)
*H01G 11/52* (2013.01)
(Continued)

(52) U.S. Cl.
CPC ............ *H01G 11/50* (2013.01); *H01G 11/52* (2013.01); *H01G 11/60* (2013.01); *H01G 11/62* (2013.01);
(Continued)

(58) Field of Classification Search
CPC ........ H01G 11/50; H01G 11/52; H01G 11/60; H01G 11/62; H01G 11/64; H01G 11/84
(Continued)

(56) References Cited

U.S. PATENT DOCUMENTS 6,203,947 B1   3/2001  Peled
7,691,538 B2   4/2010  Takahashi
(Continued)

FOREIGN PATENT DOCUMENTS

CN   101281986   10/2008
CN   101714657    5/2010
(Continued)

OTHER PUBLICATIONS

Gerald Gourdin, John Collins, Dong Zheng, Michelle Foster, Deyang Qu; "Spectroscopic Compositional Analysis of Electrolyte during Initial SEI Layer Formation"; 2014; The Journal of Physical Chemistry C2014; 118(31); pp. 17383-17394 (Year: 2014).*

*Primary Examiner* — Arun Ramaswamy
(74) *Attorney, Agent, or Firm* — Knobbe, Martens, Olson & Bear, LLP

(57) ABSTRACT

An energy storage device can include a cathode, an anode, and a separator between the cathode and the anode, and an electrolyte where the electrolyte includes one or more additives and/or solvent components selected from vinylene carbonate (VC), vinyl ethylene carbonate (VEC), dimethylacetamide (DMAc), hydro fluorinated ether branched cyclic carbonate, a hydro fluorinated ether ethylene carbonate (HFEEC), hydro fluorinated ether (HFE), and fluorinated ethylene carbonate (FEC). The electrolyte may include a carbonate based solvent and one or more solvent components and/or one or more of vinylene carbonate (VC), vinyl ethylene carbonate (VEC), dimethylacetamide (DMAc), hydro fluorinated ether branched cyclic carbonate, a hydro fluorinated ether ethylene carbonate (HFEEC), hydro fluo-
(Continued)

rinated ether (HFE), and fluorinated ethylene carbonate (FEC).

17 Claims, 13 Drawing Sheets

Related U.S. Application Data

(60) Provisional application No. 62/302,059, filed on Mar. 1, 2016.

(51) Int. Cl.
*H01G 11/60* (2013.01)
*H01G 11/62* (2013.01)
*H01G 11/64* (2013.01)
*H01G 11/84* (2013.01)
H01G 11/06 (2013.01)

(52) U.S. Cl.
CPC .............. *H01G 11/64* (2013.01); *H01G 11/84* (2013.01); *H01G 11/06* (2013.01); *Y02E 60/13* (2013.01)

(58) Field of Classification Search
USPC ........ 361/502, 503, 504; 429/330, 331, 332, 429/333
See application file for complete search history.

(56) References Cited

U.S. PATENT DOCUMENTS

| | | | |
|---|---|---|---|
| 7,910,249 B2 | 3/2011 | Lee | |
| 7,998,623 B2 | 8/2011 | Kim | |
| 8,092,942 B1 | 1/2012 | Chen | |
| 2007/0015062 A1 | 1/2007 | Lee | |
| 2008/0070104 A1 | 3/2008 | Lin | |
| 2008/0193855 A1 | 8/2008 | McDonald | |
| 2008/0241702 A1 | 10/2008 | Takahashi | |
| 2009/0197167 A1 | 8/2009 | Olschimke | |
| 2009/0253044 A1 | 10/2009 | Nogi | |
| 2010/0035162 A1 | 2/2010 | Chiga | |
| 2010/0178570 A1 | 7/2010 | Kozono | |
| 2010/0279155 A1 | 11/2010 | Scott | |
| 2010/0304225 A1 | 12/2010 | Pascaly | |
| 2011/0008681 A1 | 1/2011 | Koh | |
| 2011/0171501 A1 | 7/2011 | Okumura | |
| 2012/0323036 A1 | 12/2012 | Chen | |
| 2014/0030590 A1 | 1/2014 | Wang | |
| 2014/0113203 A1 | 4/2014 | Xiao | |
| 2015/0262761 A1 | 9/2015 | Gadkaree | |

FOREIGN PATENT DOCUMENTS

| | | | |
|---|---|---|---|
| CN | 101916878 | 12/2010 | |
| CN | 103050295 | 4/2013 | |
| CN | 103337659 | 10/2013 | |
| CN | 103682444 | 3/2014 | |
| EP | 2 840 641 A1 | 2/2015 | |
| JP | 2008176987 | 7/2008 | |
| JP | 2010024215 | 2/2010 | |
| JP | 2015 103361 A | 6/2015 | |
| JP | 2015-191738 | 11/2015 | |
| JP | 2015 191738 A | 11/2015 | |
| WO | WO 2008079670 | 7/2008 | |
| WO | WO 2009013046 | 1/2009 | |
| WO | WO 2011014451 | 2/2011 | |
| WO | WO 2011031401 | 3/2011 | |
| WO | WO-2013168755 A1 * | 11/2013 | ............... H01G 9/02 |
| WO | WO-2014203912 A1 * | 12/2014 | ........... H01M 10/052 |

* cited by examiner

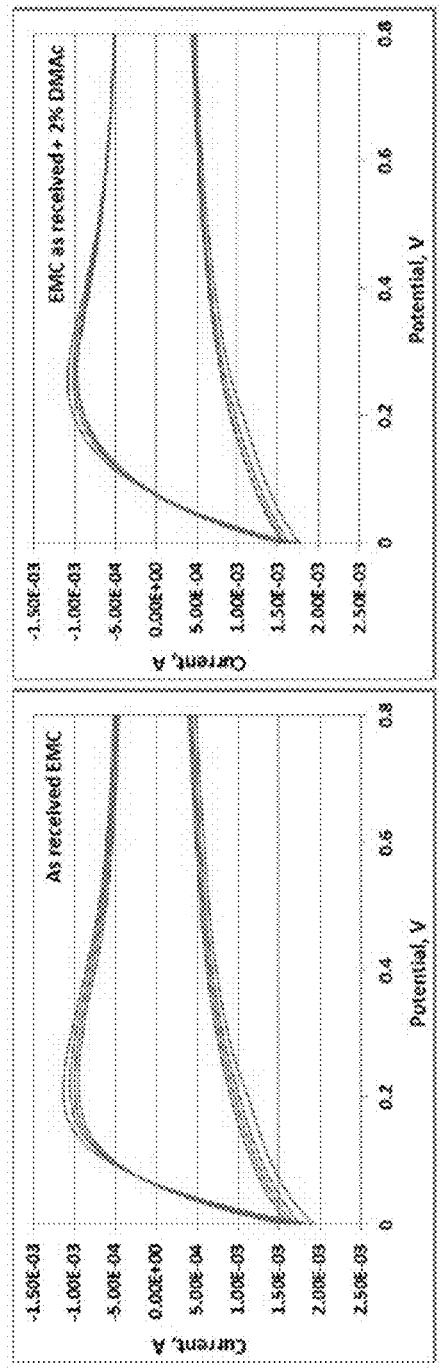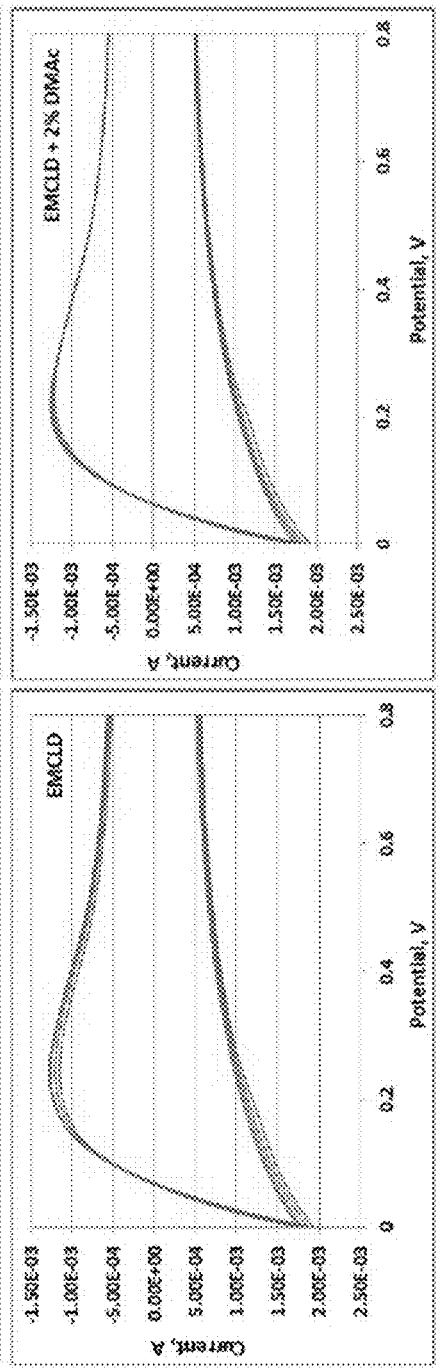
FIG. 9A  FIG. 9B  FIG. 9C  FIG. 9D

| Cell type | Usable Energy density (Wh/kg) | Usable Power density (kW/kg) |
|---|---|---|
| State of the Art | 12 | 4.6 |
| product goal baseline LiC | 13 | 6 |
| | 10.5 | 1.83 |
| 250F LiC | 14 | 5.93 |
| lab cell | 13.6 | 6.4 |

FIG. 13

ELECTROLYTE FORMULATIONS FOR ENERGY STORAGE DEVICES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 15/442,080, filed Feb. 24, 2017, which claims the benefit of priority under 35 U.S.C. § 119(e) of U.S. Provisional Application No. 62/302,059, filed Mar. 1, 2016.

BACKGROUND

Field

The present invention relates to energy storage devices, particularly to compositions of electrolytes of energy storage devices.

Description of the Related Art

Various types of energy storage devices can be used to power electronic devices, including for example, capacitors, batteries, capacitor-battery hybrids and/or fuel cells. An energy storage device, such as a lithium ion capacitor, having an improved electrolyte formulation can facilitate improved capacitor electrical performance.

SUMMARY

For purposes of summarizing the invention and the advantages achieved over the prior art, certain objects and advantages of the invention are described herein. Not all such objects or advantages may be achieved in any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In a first aspect, a lithium ion capacitor is provided, comprising a cathode, an anode, a separator between the cathode and the anode, an electrolyte comprising a solvent, a lithium salt, and one or more additives, wherein the one or more additives is selected from the group consisting of vinylene carbonate (VC), vinyl ethylene carbonate (VEC), a hydro fluorinated ether ethylene carbonate (HFEEC), dimethyl acetamide (DMAc), a hydro fluorinated ether (HFE), hydro fluorinated ether branched cyclic carbonate, and a fluorinated ethylene carbonate (FEC), and combinations thereof; and wherein the electrolyte comprises each of the one or more additives in about 0.5 wt % to about 5 wt %.

In an embodiment of the first aspect, the lithium ion capacitor solvent comprises one or more carbonates. In an embodiment of the first aspect, the one or more carbonates are selected from the group consisting of EC (ethylene carbonate), PC (propylene carbonate), DEC (diethylcarbonate), DMC (dimethylcarbonate), EMC (ethyl methyl carbonate), and combinations thereof. In an embodiment of the first aspect, the solvent comprises an ester selected from the group consisting of MP (methyl propionate), EB (ethyl butyrate), MB (methyl butyrate), EA (ethyl acetate), and combinations thereof. In an embodiment of the first aspect, the lithium salt is $LiPF_6$. In an embodiment of the first aspect, the $LiPF_6$ is present in the electrolyte in a concentration of about 0.8 to 1.4 M. In an embodiment of the first aspect, the $LiPF_6$ is present in the electrolyte in a concentration of about 0.6 to 0.95 M. In an embodiment of the first aspect, the solvent comprises EC/PC/DEC, EC/DEC/DMC/EB, EC/EMC, EC/EMC/MP, EC/DEC/DMC/EMC, or EC/DMC/EB. In an embodiment of the first aspect, the solvent comprises EC/PC/DEC in a ratio of about 3:1:4 by volume, EC/DEC/DMC/EB in a ratio of about 1:1:1:1 by volume, EC/EMC in a ratio of about 3:7 by volume, EC/EMC/MP in a ratio of about 1:1:8 by volume, EC/DEC/DMC/EMC in a ratio of about 1:1:1:2 by volume, or EC/DMC/EB in a ratio of about 1:1:1 by volume.

In a second aspect, a lithium ion capacitor is provided, comprising a cathode, an anode, a separator between the cathode and the anode, and an electrolyte comprising a solvent, a lithium salt, and one or more additives, wherein the one or more additives is selected from the group consisting of an anode passivation film forming agent, a cathode protection and overcharge protection agent, an electrolyte stabilizer, and combinations thereof, and wherein the electrolyte comprises each of the one or more additives in about 0.5 wt % to about 5 wt %.

In an embodiment of the second aspect, the additive is an anode passivation film forming agent selected from the group consisting of vinylene carbonate (VC), vinyl ethylene carbonate (VEC), a fluorinated ethylene carbonate (FEC), a hydro fluorinated ether ethylene carbonate (HFEEC), and combinations thereof. In an embodiment of the second aspect, the additive is vinylene carbonate (VC). In an embodiment of the second aspect, the additive is vinyl ethylene carbonate (VEC). In an embodiment of the second aspect, the additive is a fluorinated ethylene carbonate (FEC). In an embodiment of the second aspect, the additive is a hydro fluorinated ether ethylene carbonate (HFEEC). In an embodiment of the second aspect, the additive is a cathode protection and overcharge protection agent selected from the group consisting of dimethyl acetamide (DMAc), a hydro fluorinated ether (HFE), and combinations thereof. In an embodiment of the second aspect, the additive is dimethyl acetamide (DMAc). In an embodiment of the second aspect, the additive is a hydro fluorinated ether (HFE). In an embodiment of the second aspect, the additive is an electrolyte stabilizer selected from a fluorinated ethylene carbonate (FEC). In an embodiment of the second aspect, the solvent comprises one or more carbonates selected from the group consisting of EC (ethylene carbonate), PC (propylene carbonate), DEC (diethylcarbonate), DMC (dimethylcarbonate), EMC (ethyl methyl carbonate), and combinations thereof. In an embodiment of the second aspect, the lithium salt is $LiPF_6$. In an embodiment of the second aspect, the anode is a free-standing dry particle electrode formed from a dry particle mixture.

In a third aspect, a method for fabricating a lithium ion capacitor is provided, comprising providing a cathode, providing an anode, placing a separator between the cathode and the anode, inserting the cathode, the anode, and the separator into a housing, and adding an electrolyte to the housing, and contacting the electrolyte with the cathode and the anode, wherein the electrolyte comprises a solvent, a lithium salt, and one or more additives, wherein the one or more additives is selected from the group consisting of an anode passivation film forming agent, a cathode protection and overcharge protection agent, and an electrolyte stabilizer, and combinations thereof, and wherein the electrolyte comprises each of the one or more additives in about 0.5 wt % to about 5 wt %.

In an embodiment of the third aspect, the anode comprises a current collector and an electrode film formed using a dry process from a dry particles mixture. In an embodiment of the third aspect, the solvent comprises one or more carbonates. In an embodiment of the third aspect, the one or more carbonates are selected from the group consisting of EC (ethylene carbonate), PC (propylene carbonate), DEC (diethylcarbonate), DMC (dimethylcarbonate), EMC (ethyl methyl carbonate), and combinations thereof. In an embodiment of the third aspect, the solvent comprises an ester selected from the group consisting of MP (methyl propionate), EB (ethyl butyrate), MB (methyl butyrate), EA (ethyl acetate), and combinations thereof. In an embodiment of the third aspect, the lithium salt is $LiPF_6$. In an embodiment of the third aspect, the $LiPF_6$ is present in the electrolyte in a concentration of about 0.8 to 1.4 M. In an embodiment of the third aspect, the $LiPF_6$ is present in the electrolyte in a concentration of about 0.6 to 0.95 M. In an embodiment of the third aspect, the solvent comprises EC/PC/DEC, EC/DEC/DMC/EB, EC/EMC, EC/EMC/MP, EC/DEC/DMC/EMC, or EC/DMC/EB. In an embodiment of the third aspect, the solvent comprises EC/PC/DEC in a ratio of about 3:1:4 by volume, EC/DEC/DMC/EB in a ratio of about 1:1:1:1 by volume, EC/EMC in a ratio of about 3:7 by volume, EC/EMC/MP in a ratio of about 1:1:8 by volume, EC/DEC/DMC/EMC in a ratio of about 1:1:1:2 by volume, or EC/DMC/EB in a ratio of about 1:1:1 by volume.

BRIEF DESCRIPTION OF THE DRAWINGS

These and other features, aspects, and advantages of the present disclosure are described with reference to the drawings of certain embodiments, which are intended to illustrate certain embodiments and not to limit the invention.

FIGS. 9A-9D are graphs showing cyclic voltammetry curves of anodes of lithium ion capacitors comprising an EC-DEC-DMC-EMC containing electrolyte, as received and without dimethylacetamide (DMAc), as received and with 2 weight % dimethylacetamide (DMAc), purified and without DMAc, and purified and with 2 weight % DMAc, respectively.

FIG. 13 is a table listing usable energy density and usable power density of lithium ion capacitors comprising one or more multifunctional additives as described herein.

DETAILED DESCRIPTION

Figure 1:
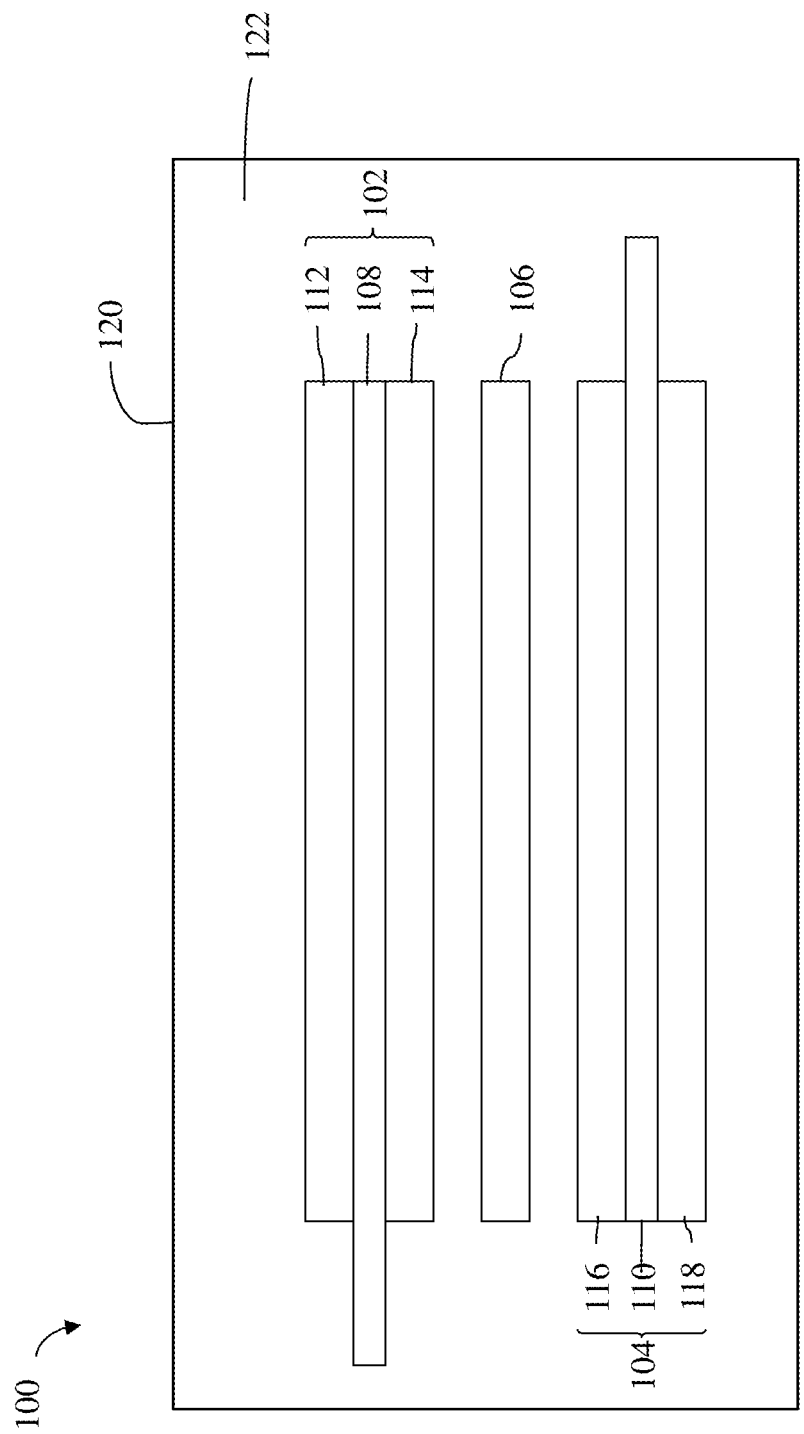
FIG. 1 shows a side cross-sectional schematic view of an example of an energy storage device, according to one embodiment.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

In some embodiments, an energy storage device, such as a lithium ion capacitor (LiC), with improved electrical performance characteristics is provided. In some embodiments, the lithium ion capacitor can have an improved electrolyte formulation. In some embodiments, the lithium ion capacitor can have an electrolyte formulation configured to facilitate desired device electrical performance under high operating temperatures, such as operating temperatures of about 50° C. to about 70° C. For example, the lithium ion capacitor may have an electrolyte comprising one or more solvent components and/or one or more additives selected to advantageously facilitate anode passivation film formation (an anode passivation film forming agent), provide protection for the cathode and protection against overcharge (cathode protection and overcharge protection agent), and/or stabilization of the electrolyte (electrolyte stabilizer). In some embodiments, the one or more additives comprises one or more multifunctional compounds comprising one or more of vinylene carbonate (VC), vinyl ethylene carbonate (VEC), dimethylacetamide (DMAc), a hydro fluorinated ether branched cyclic carbonate, a hydro fluorinated ether (HFE), a hydro fluorinated ether ethylene carbonate (HFEEC), and fluorinated ethylene carbonate (FEC). In some embodiments, the one or more multifunctional compounds may be a component of the solvent of the electrolyte. In some embodiments, the electrolyte comprises a carbonate based solvent as well as one or more solvent components and/or one or more additives described herein. In some embodiments, one or more solvent components and/or additives are included in the electrolyte to facilitate desired anode passivation film formation, protection for the cathode and protection against overcharge, and stabilization of the electrolyte.

A lithium ion capacitor comprising an electrolyte having a composition described herein may advantageously demonstrate reduced equivalent series resistance, increased energy density and/or power density performance, increased lifetime, and/or improved device safety, for example, under high operating temperatures. In some embodiments, a lithium ion capacitor comprising an electrolyte having a composition described herein may advantageously demonstrate improved operating voltage, and/or robust cyclability. In some embodiments, lithium ion capacitors comprising an electrolyte described herein can have a variety of shapes, including prismatic, cylindrical and/or button shaped. In some embodiments, lithium ion capacitors comprising an electrolyte described herein can be used in applications in wind power generation systems, uninterruptible power source systems (UPS), photo voltaic power generation, energy recovery systems in industrial machinery and/or transportation systems. In some embodiments, a lithium ion capacitor comprising an electrolyte as described herein can be used to power hybrid electric vehicles (HEV), plug-in hybrid electric vehicles (PHEV), and/or electric vehicles (EV) vehicles.

Electrolytes which do not include the solvent components and additives described herein may not demonstrate a desired range of operating voltage, equivalent series resistance, operating temperature range, device lifetime and/or device safety. For example, an electrolyte consisting or consisting essentially of $LiPF_6$ salt and a carbonate solvent, without the components or additives described in the embodiments herein, may demonstrate lower operating voltage, increased equivalent series resistance, reduced operating temperature range, shortened lifetime and/or reduced device safety, relative to the described embodiments.

It will be understood that although the electrodes and energy storage devices herein may be described within a context of lithium ion capacitors, the embodiments can be implemented with any of a number of energy storage devices and systems, such as one or more batteries, capacitors, capacitor-battery hybrids, fuel cells, combinations thereof, and the like, with or without lithium.

FIG. 1 shows a side cross-sectional schematic view of an example of an energy storage device 100. The energy storage device 100 may be a lithium ion capacitor. Of course, it should be realized that other energy storage devices are within the scope of the invention, and can include batteries, capacitor-battery hybrids, and/or fuel cells. The energy storage device 100 can have a first electrode 102, a second electrode 104, and a separator 106 positioned between the first electrode 102 and second electrode 104. For example, the first electrode 102 and the second electrode 104 may be placed adjacent to respective opposing surfaces of the separator 106. The first electrode 102 may comprise a cathode and the second electrode 104 may comprise an anode, or vice versa. The energy storage device 100 may include an electrolyte 122 to facilitate ionic communication between the electrodes 102, 104 of the energy storage device 100. For example, the electrolyte 122 may be in contact with the first electrode 102, the second electrode 104 and the separator 106. The electrolyte 122, the first electrode 102, the second electrode 104, and the separator 106 may be received within an energy storage device housing 120. For example, the energy storage device housing 120 may be sealed subsequent to insertion of the first electrode 102, second electrode 104 and the separator 106, and impregnation of the energy storage device 100 with the electrolyte 122, such that the first electrode 102, the second electrode 104, the separator 106, and the electrolyte may be physically sealed from an environment external to the housing. Electrolyte 122 optionally includes one or more additives as provided herein.

The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a variety of porous electrically insulating materials. In some embodiments, the separator 106 can comprise a polymeric material. For example, the separator 106 can comprise a cellulosic material (e.g., paper), a polyethylene (PE) material, a polypropylene (PP) material, and/or a polyethylene and polypropylene material.

As shown in FIG. 1, the first electrode 102 and the second electrode 104 include a first current collector 108, and a second current collector 110, respectively. The first current collector 108 and the second current collector 110 may facilitate electrical coupling between the corresponding electrode and an external circuit (not shown). The first current collector 108 and/or the second current collector 110 can comprise one or more electrically conductive materials, and/or have various shapes and/or sizes configured to facilitate transfer of electrical charges between the corresponding electrode and a terminal for coupling the energy storage device 100 with an external terminal, including an external electrical circuit. For example, a current collector can include a metallic material, such as a material comprising aluminum, nickel, copper, silver, alloys thereof, and/or the like. For example, the first current collector 108 and/or the second current collector 110 can comprise an aluminum foil having a rectangular or substantially rectangular shape and can be dimensioned to provide desired transfer of electrical charges between the corresponding electrode and an external electrical circuit (e.g., via a current collector plate and/or another energy storage device component configured to provide electrical communication between the electrodes and the external electrical circuit).

The first electrode 102 may have a first electrode film 112 (e.g., an upper electrode film) on a first surface of the first current collector 108 (e.g., on a top surface of the first current collector 108) and a second electrode film 114 (e.g., a lower electrode film) on a second opposing surface of the first current collector 108 (e.g., on a bottom surface of the first current collector 108). Similarly, the second electrode 104 may have a first electrode film 116 (e.g., an upper electrode film) on a first surface of the second current collector 110 (e.g., on a top surface of the second current collector 110), and a second electrode film 118 on a second opposing surface of the second current collector 110 (e.g., on a bottom surface of the second current collector 110). For example, the first surface of the second current collector 110 may face the second surface of the first current collector 108, such that the separator 106 is adjacent to the second electrode film 114 of the first electrode 102 and the first electrode film 116 of the second electrode 104.

The electrode films 112, 114, 116 and/or 118 can have a variety of suitable shapes, sizes, and/or thicknesses. For example, the electrode films can have a thickness of about 30 microns (μm) to about 250 microns, including about 100 microns to about 250 microns. It will be understood that embodiments described herein can be implemented with one or more electrodes, and with electrode(s) that have one or more electrode films, and should not be limited to the embodiment shown in FIG. 1.

In some embodiments, an electrode film of an anode and/or a cathode of a lithium ion capacitor comprises a mixture comprising binder material and carbon. In some embodiments, the electrode film of an anode and/or a cathode can include one or more additives, including conductive additives. In some embodiments, the binder material can include one or more fibrillizable binder components. For example, a process for forming an electrode film can include fibrillizing the fibrillizable binder component such that the electrode film comprises fibrillized binder. The binder component may be fibrillized to provide a plurality of fibrils, the fibrils providing desired mechanical support for one or more other components of the film. For example, a matrix, lattice and/or web of fibrils can be formed to provide desired mechanical structure for the electrode film. For example, a cathode and/or an anode of a lithium ion capacitor can include one or more electrode films comprising one or more fibrillized binder components. In some embodiments, a binder component can include one or more of a variety of suitable fibrillizable polymeric materials, such as polytetrafluoroethylene (PTFE), ultra-high molecular weight polyethylene (UHMWPE), and/or other suitable fibrillizable materials, used alone or in combination.

In some embodiments, the electrode film of a lithium ion capacitor cathode can comprise an electrode film mixture comprising one or more carbon based electroactive components, including for example a porous carbon material, such as activated carbon. In some embodiments, the electrode film of a lithium ion capacitor anode comprises an electrode film mixture comprising carbon configured to reversibly intercalate lithium ions. In some embodiments, the lithium intercalating carbon is graphite. In some embodiments, the electrode film of the cathode and/or anode can include an electrical conductivity promoting additive, for example, comprising carbon black. In some embodiments, the electrode film of the cathode comprises, or consists essentially of, activated carbon. In some embodiments, the electrode film of a cathode and/or an anode of a lithium ion capacitor can comprise about 50 weight % to about 99 weight %, including from about 60 weight % to about 95 weight % of carbon. In some embodiments, the electrode film of a cathode and/or an anode includes about 1 weight % to about 50% by weight of binder material, including about 1 weight % to about 40 weight %, or about 1 weight % to about 20 weight %. In some embodiments, the electrode film of a cathode and/or an anode can include up to about 40 weight % of an electrical conductivity promoting additive, including about 0.5 weight % to about 30 weight %, or about 0.5 weight % to about 20 weight %. In certain embodiments, the cathode does not comprise a metal oxide. In certain embodiments, the cathode does not comprise a lithium oxide. In certain embodiments, the energy storage device is not a lithium ion battery.

In some embodiments, an energy storage device, such as device 100, can be fabricated by a method comprising providing a cathode and providing an anode, such as electrodes 102, 104; placing a separator, such as separator 106, between the cathode and the anode, inserting the cathode, the anode, and the separator into a housing, such as housing 120, and adding an electrolyte, such as electrolyte 122, to the housing, and contacting the electrolyte with the cathode and the anode; wherein the electrolyte comprises a solvent, a lithium salt, and one or more additives, wherein the one or more additives is selected from the group consisting of an anode passivation film forming agent, a cathode protection and overcharge protection agent, and an electrolyte stabilizer, and wherein the electrolyte comprises the one or more additives in about 0.5 wt % to about 5 wt %.

In some embodiments, one or more electrode films described herein can be fabricated using a dry fabrication process. As used herein, a dry fabrication process can refer to a process in which no or substantially no solvents are used in the formation of an electrode film. For example, components of the electrode film may comprise dry particles. The dry particles for forming the electrode film may be combined to provide a dry particles electrode film mixture. In some embodiments, the electrode film may be formed from the dry particles electrode film mixture using the dry fabrication process such that weight percentages of the components of the electrode film and weight percentages of the components of the dry particles electrode film mixture are similar or the same. In some embodiments, the electrode film formed from the dry particles electrode film mixture using the dry fabrication process may be free or substantially free from any processing solvents, and solvent residues resulting therefrom. In some embodiments, the electrode films are free-standing dry particle electrode films formed using the dry process from the dry particles mixture.

The energy storage device 100 can include an electrolyte 122 comprising a solvent, a salt, such as a lithium salt, and/or one or more additives. In some embodiments, the composition of the electrolyte is selected to provide a lithium ion capacitor with desired electrical performance. In some embodiments, the solvent and/or one or more additives are selected to provide a lithium ion capacitor which demonstrates reduced equivalent series resistance, increased energy and power density, increased lifetime, and/or improved device safety, including under high operating temperatures, such as operating temperatures of about 50° C. to about 70° C. In some embodiments, the solvent and/or the one or more additives can be selected to advantageously facilitate anode passivation film formation (an anode passivation film forming agent), provide protection for the cathode and protection against overcharge (cathode protection and overcharge protection agent), and/or stabilization of the electrolyte (electrolyte stabilizer). In some embodiments, the electrolyte comprises one or more solvent components and/or one or more additives configured to facilitate passivation film formation, provide protection for the cathode and protection against overcharge, and stabilization of the electrolyte, such that synergy between the components of the electrolyte facilitate desired device electrical performance. It will be understood that the solvent, solvent components, and/or additives can be selected, combined, and/or configured to provide any combination of the aforementioned advantages.

As used herein, a solvent component refers to a constituent of the electrolyte configured to facilitate dissolution and/or suspension of a solute, such as a solid, liquid or gaseous solute, where the solvent component is about 10 weight % to about 40 wt % of the electrolyte. For example, the solute may comprise an electrolyte salt, such that the electrolyte salt is dissolved in the solvent component, thereby forming a solution comprising the electrolyte salt and the solvent component. In some embodiments, the solvent comprises more than one solvent component compound. For example, the solvent may comprise one or more solvent component compounds selected to provide an electrolyte with desired characteristics. As used herein, an electrolyte additive refers to a constituent of the electrolyte, generally provided in lower weight % than other constituents of the electrolyte, selected and/or configured to provide an electrolyte with desired characteristics as provided herein. In some embodiments, the solvent comprises each of the one or more additives in about 0.5 weight % (wt %) to about 5 wt %, or in some embodiments, about 0.5 wt % to about 4 wt %, or in some embodiments, about 0.5 wt % to about 3 wt %, or in some embodiments, about 0.5 wt % to about 2 wt %, or in some embodiments, about 0.5 wt % to about 1.5 wt %, or in some embodiments, about 0.5 wt % to about 1% wt %. In further embodiments, the solvent comprises a total mass of additives in about 0.5 wt % to about 10 wt %, about 0.5 wt % to about 7.5 wt %, about 0.5 wt % to about 5 wt %, about 0.5 wt % to about 4 wt %, about 0.5 wt % to about 3 wt %, about 0.5 wt % to about 2 wt %, or about 0.5 wt % to about 1 wt %. In some embodiments, the electrolyte comprises a lithium salt and a carbonate based solvent, along with one or more solvent components and/or additives described herein. In some embodiments, the solvent can comprise a sulfonate ester, such as a sultone. In further embodiments, the sulfonate ester can be selected from 1,3-propane sultone (PS), and prop-1-ene-1,3-sultone (PES).

In some embodiments, the solvent and/or the one or more additives comprise fluorinated compounds. In some embodiments, fluorochemicals may facilitate thermal and/or electrochemical stability under operating conditions. Specifically, substitution of hydrogen by fluorine in hydrocarbons and their derivatives, such as ethers, is known to change the electrochemical characteristics of these compounds. In some embodiments, the solvent and/or the one or more additives comprise non-fluorinated compounds. In some embodiments, the electrolyte is non-aqueous. In some embodiments, the fluorinated compound can be a fluorinated ether such as a hydro fluorinated ether. Commercial examples of hydro fluorinated ethers include HFE-7200 and HFE-7500. In further embodiments, the hydro fluorinated ether can be an alkyl-perfluoroalkyl ether. In still further embodiments, the hydro fluorinated ether can be an alkyl-branched perfluoroalkyl ether. In some embodiments, the hydro fluorinated ether can be a $C_1$-$C_{10}$ alkyl-$C_1$-$C_{10}$ perfluoroalkyl ether. In some embodiments, the hydro fluorinated ether can have the structure of Formula I:

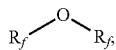

wherein each $R_f$ independently has the formula $C_nH_mF_{(m-2n+2)}$, where n is an integer from 1-10. In some embodiments, the hydro fluorinated ether can be a perfluoroether. In certain embodiments, the hydro fluorinated ether can have the structure of Formula II or Formula III:

Formula II

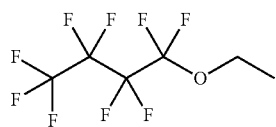

Formula III

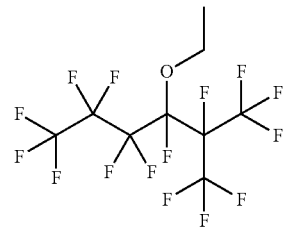

In some embodiments, the fluorinated compound can be a hydro fluorinated ether ethylene carbonate (HFEEC). In further embodiments, the HFEEC can have the structure of Formula IV:

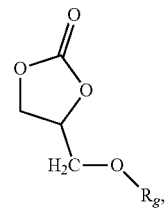

wherein $R_g$ is a fluorinated alkyl moiety. In still further embodiments, the fluorinated alkyl moiety can comprise 1 to 10 carbon atoms. In still further embodiments, $R_g$ can have the formula $C_pH_qF_{(q-2p+2)}$. In certain embodiments, $R_g$ is a perfluoroalkyl moiety. In some embodiments, the fluorinated compound comprises a hydro fluorinated ether-branched cyclic carbonate. In some embodiments, the fluorinated compound can be a fluorinated ethylene carbonate (FEC). Generally, a fluorinated ethylene carbonate can be ethylene carbonate substituted with 1 to 4 fluorine atoms. In some embodiments, the fluorinated ethylene carbonate can have the structure

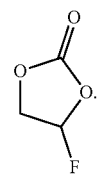

In some embodiments, the fluorinated compound can be hydro fluorinated ether branched cyclic carbonate.

As described herein, in some embodiments, the solvent and/or the additive of the electrolyte are selected so as to facilitate formation of an anode passivation film, or serve as an anode passivation agent. For example, the electrolyte may comprise one or more solvent components and/or one or more additives to facilitate formation of a solid electrolyte interphase (SEI) layer comprising desired chemical composition. The solid electrolyte interphase layer may be formed over a surface of the lithium ion capacitor anode exposed to the electrolyte during charge and/or discharge of the lithium ion capacitor. The solid electrolyte interphase may be formed in part due to decomposition of one or more components of the electrolyte. For example, single-step or multi-stop decomposition reactions which transfer electron(s) to one or more solid electrolyte interphase-forming components of the electrolyte may result in formation of the solid electrolyte interphase at the interface between the anode and electrolyte. One or more properties of the solid electrolyte interphase layer, such as chemical composition of the solid electrolyte interphase, may depend at least in part on the chemical composition of the electrolyte. In some embodiments, chemical composition of the solid electrolyte interphase can depend at least in part on the solvent, additive and/or impurities of the electrolyte.

In some embodiments, electrolyte comprising one or more additives and/or solvent components described herein may facilitate efficient formation of a desired solid electrolyte interphase layer for a lithium ion capacitor configured to operate under high temperatures, such as temperatures of about 50° C. to about 70° C. For example, the solid electrolyte interphase layer may demonstrate improved thermal stability, improved electrochemical stability, and/or reduced secondary reactions with one or more other components of the lithium ion capacitor, while maintaining desired ionic conductivity. In some embodiments, the solid electrolyte interphase layer may demonstrate can be highly stable under high temperature cycling. A lithium ion capacitor which has a solid electrolyte interphase layer comprising desired chemical composition may demonstrate improved electrical properties, including increased device cycle life, lifetime, power capability, improved device safety and/or improved anode stability, including during operation under high temperatures. A lithium ion capacitor which has a solid electrolyte interphase layer comprising desired chemical composition may demonstrate lower operable anode potential, and/or higher operable potential for the capacitor.

In some embodiments, an electrolyte additive selected and/or configured to facilitate formation of a desired solid electrolyte interphase layer, such as the anode passivation agent, comprises one or more of vinylene carbonate (VC) and vinyl ethylene carbonate (VEC). In some embodiments, the electrolyte additive comprises a fluorinated compound as provided herein. In some embodiments, the electrolyte additive may be fluoroethylene carbonate (FEC). In some embodiments, the electrolyte additive comprises a fluoroether, such as a hydro fluorinated ether (HFE) as provided herein. In some embodiments, the electrolyte additive comprises a hydro fluorinated ether-branched cyclic carbonate. In some embodiments, the electrolyte additive may be hydro fluorinated ether ethylene carbonate (HFEEC). In some embodiments, the electrolyte can include a fluorinated compound additive at about 1 weight % to about 5 weight %, including about 1 weight % to about 4 weight %, or about 1 weight % to about 3 weight %. In some embodiments, the electrolyte may comprise one or more additives as provided herein in an electrolyte comprising $LiPF_6$ as a salt, and in some embodiments, with a carbonate based solvent, such as for applications which undergo high temperature cycling. In some embodiments, high temperature cycling can be performed at temperatures of about 50° C. to about 70° C. In some embodiments, the electrolyte may comprise one or more additives as provided herein in combination with the following composition: 1.2 M $LiPF_6$ in a solvent of EC/PC/DEC.

In some embodiments, the fluorinated compound may serve as a component of the solvent. For example, a solvent of the electrolyte may comprise one or more of FEC and/or HFEEC.

In some embodiments, a lithium ion capacitor comprising an electrolyte described herein can maintain the equivalent series resistance and/or RC time constant, for example relative to an electrolyte without the one or more additives described herein. For example, a lithium ion capacitor comprising an electrolyte comprising one or more of VC, VEC and FEC may demonstrate equivalent series resistance and/or RC time constant at least at the level of an electrolyte without any of these additives.

In some embodiments, the electrolyte can include an additive and/or a solvent component configured to facilitate improved protection of the cathode and protection for overcharge, or a cathode protection and overcharge protection agent. For example, the electrolyte may comprise a cathode protection and overcharge protection agent to facilitate suppression of decomposition of electrolyte at the cathode and contribution of electrolyte impurities to the solid electrolyte interphase layer formation at the anode, and thereby facilitating a higher operable cathode potential and/or extended device lifetime. The electrolyte impurities may include, for example, hydrogen fluoride (HF) and/or water ($H_2O$). In some embodiments, the additive and/or solvent component configured to facilitate improved cathode protection and overcharge protection can include a fluorinated compound. In some embodiments, the fluorinated compound comprises a hydro fluorinated ether (HFE) as provided herein. In some embodiments, the additive and/or solvent component configured to facilitate improved cathode protection and overcharge protection includes a non-fluorinated compound. In further embodiments, the cathode protection and overcharge protection agent can be a lower dialkyl amide derivative of a $C_{1-10}$ alkyl carboxylate. In further embodiments, the cathode protection and overcharge protection agent can be a dimethyl amide derivative of a $C_{1-10}$ alkyl carboxylate. In some embodiments, the cathode protection and overcharge protection agent, for example such as a non-fluorinated compound, comprises dimethylacetamide (DMAc).

In some embodiments, the electrolyte can include an additive and/or a solvent component configured to facilitate electrolyte stabilization, or an electrolyte stabilizing agent. For example, an electrolyte stabilizing agent can facilitate providing an electrolyte with desired thermal and/or electrochemical stability. In some embodiments, the electrolyte stabilizing agent can facilitate formation of a solid electrolyte interphase layer with improved thermal and/or electrochemical stability, while providing desired ionic conductivity. In some embodiments, the additive and/or solvent component configured to facilitate electrolyte stabilization comprises a fluorinated compound as provided herein. In further embodiments, the fluorinated compound can be a fluorinated ethylene carbonate (FEC) as provided herein. In some embodiments, the fluorinated electrolyte stabilizing agent may replace one or more non-fluorinated carbonate components of the solvent.

In some embodiments, a lithium salt can include lithium hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), combinations thereof, and/or the like. As described herein, in some embodiments, the one or more solvent components and/or additives may be combined with the lithium salt, and a carbonate based solvent. In some embodiments, the one or more solvent components and/or additives may be combined with the lithium salt, and a solvent comprising: ethylene carbonate (EC), dimethyl carbonate (DMC), diethyl carbonate (DEC), ethyl methyl carbonate (EMC), ethyl butyrate (EB), propylene carbonate (PC), and combinations thereof. In some embodiments, the solvent comprises EC/PC/DEC optionally in a ratio of about 3:1:4 by volume, EC/DEC/DMC/EB optionally in a ratio of about 1:1:1:1 by volume, EC/EMC optionally in a ratio of about 3:7 by volume, EC/EMC/MP optionally in a ratio of about 1:1:8 by volume, EC/DEC/DMC/EMC optionally in a ratio of about 1:1:1:2 by volume, or EC/DMC/EB optionally in a ratio of about 1:1:1 by volume. In some embodiments, the lithium salt is present in the electrolyte in a concentration of about 0.1 M to about 2 M, for example about 0.8 M to about 1.4 M, or about 0.6 M to about 0.95 M. In some embodiments, the one or more solvent components and/or additives described herein may be added to an electrolyte having the following composition: 1.2 M $LiPF_6$ in EC/PC/DEC (3:1:4 by vol), 1.0 M $LiPF_6$ in EC/DEC/DMC/EB (1:1:1:1 by vol), 1.0 M $LiPF_6$ in EC/EMC (3:7 by vol), 1.4 M $LiPF_6$ in EC/EMC/MP (1:1:8 by vol), or 1.0 M $LiPF_6$ in EC/DEC/DMC/EMC (1:1:1:2 by vol). In additional embodiments, the solvent can comprise an ester selected from the group consisting of MP (methyl propionate), EB (ethyl butyrate), MB (methyl butyrate), EA (ethyl acetate), and combinations thereof. In further embodiments, the solvent comprises 1 to 3 of EC, DMC, DEC, EMC, EB, PC, MP, EB, MB, and EA, wherein each solvent component is present in the solvent in about 10% to 80% by volume. For example, in certain embodiments, the solvent comprises 10-30% EC-10-30% PC-40-70% DEC, 10-30% EC 10-30% DEC-10-30% DMC-10-30% EB, 10-30% EC-70-90% EMC, 5-15% EC-5-15% EMC-30-90% MP, 10-30% EC-10-30% DEC-10-30% DMC-30-50% EMC, or 15-40% EC-15-40% DMC-15-40% EB.

FIGS. 2 through 13 show various graphs to demonstrate and compare the electrochemical performance of various embodiments of lithium ion capacitors which include electrolyte compositions as described herein, relative to each other, and/or relative to the performance of some devices that do not have the solvent components and/or additives described herein.

Figure 2:
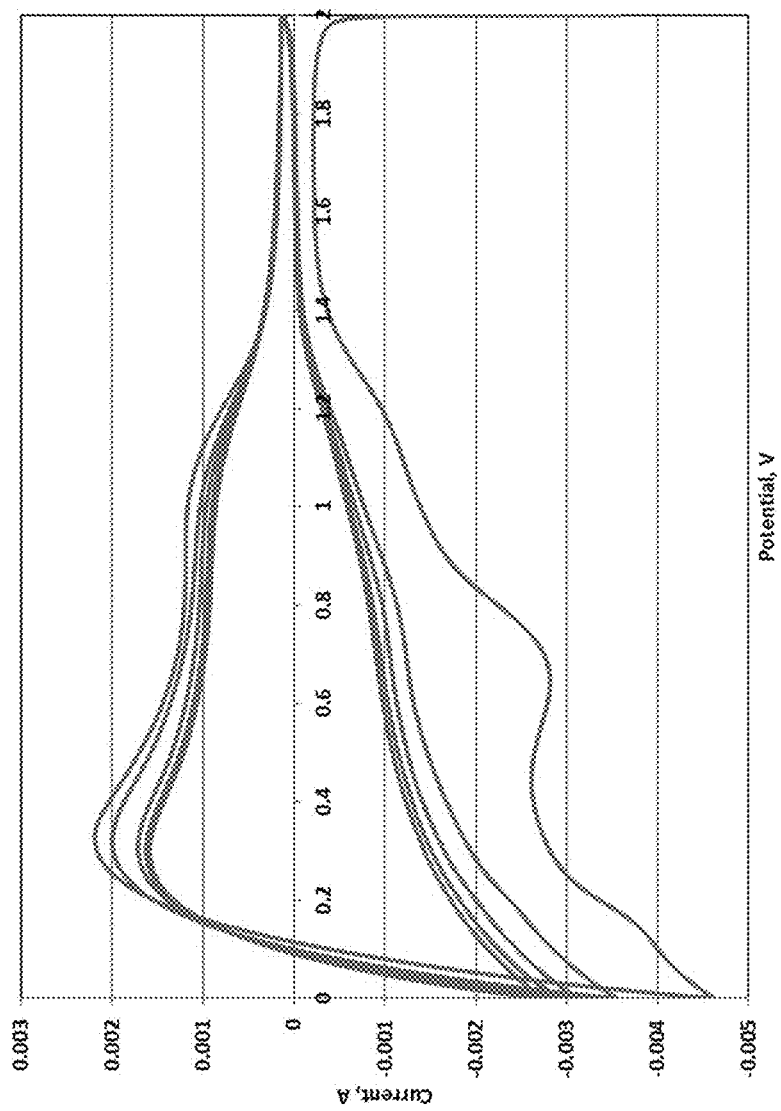
FIG. 2 is a graph showing cyclic voltammetry curves of an anode of a lithium ion capacitor comprising a EC-PC-DEC electrolyte not including an additive.

FIG. 2 is a graph showing cyclic voltammetry measured at the anode of a lithium ion capacitor cycled at a temperature of about 65° C., where the lithium ion capacitor included an electrolyte having the following composition: 1.2 Molar (M) $LiPF_6$ in EC-PC-DEC solvent. The y-axis shows current, measured in amperes (A), and the x-axis shows potential, measured in Volts (V). As can be seen in this figure, there are two reductive current "peaks" in the first cycle. The "peaks" described herein are not necessarily defined as an explicit "high" or "low" point on the y-axis. Instead, the peaks are those points on the voltammetry chart believed to be attributed to a performance-related occurrence in the cyclic operation of the device, based upon a person of ordinary skill in the art analyzing the slope and curvature of the curve defining the cycle. For example, the following two peaks in the first cycle are believed to be attributed to the formation of SEI film on the surface of the anode: the first peak from the right, having its peak at about 1.2 V, is believed to be due to the formation of $Li_2CO_3$ by a single electron reduction of the solvent/additive, and the second peak, around 0.7 V, is believed to be related to the formation of lithium alkylcarbonates ($ROCO_2Li$) resulting from double electron reduction processes of solvent components. The pair of reduction and oxidation peaks found at around 0 V and 0.3 V are believed to correspond to the processes of lithium-ion insertion and extraction, respectively. The overall shape of the curves, for example, the shape of their respective peaks, show significant variation between the cycles, for example, when compared with the variation between the cycles in the graphs of FIG. 3A and FIG. 3B. Similar definitions, analyses and comparisons can be made between the other voltammetry charts herein.

Figure 3A:
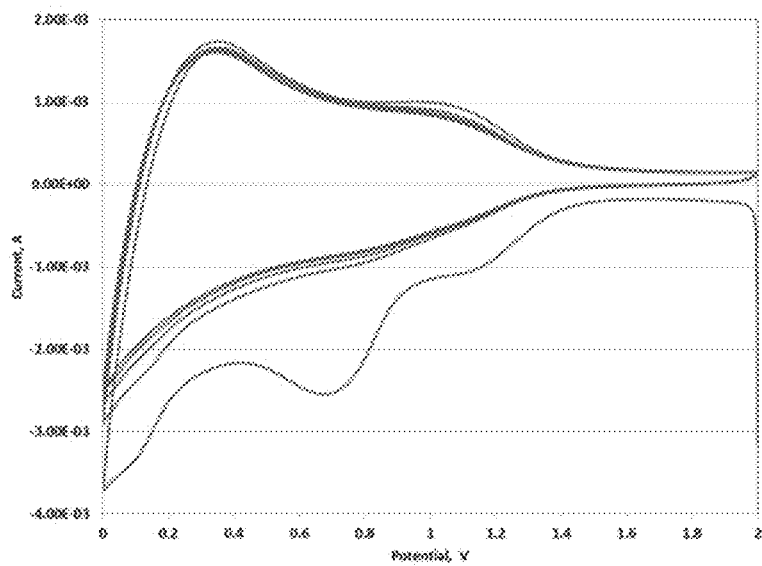
FIGS. 3A and 3B are graphs showing cyclic voltammetry curves of an anode of a lithium ion capacitor comprising a EC-PC-DEC electrolyte with 1 weight % VC and 2 weight % VC, respectively.

FIG. 3A is a graph showing cyclic voltammetry measured at the anode of a lithium ion capacitor cycled at a temperature of about 65° C., where the lithium ion capacitor included an electrolyte having the following composition: 1.2 Molar (M) $LiPF_6$ in EC-PC-DEC solvent and 1 weight % VC. Thus, FIG. 3A shows the performance of a capacitor similar to that shown in FIG. 2, but with an electrolyte additive at this percentage.

Figure 3B:
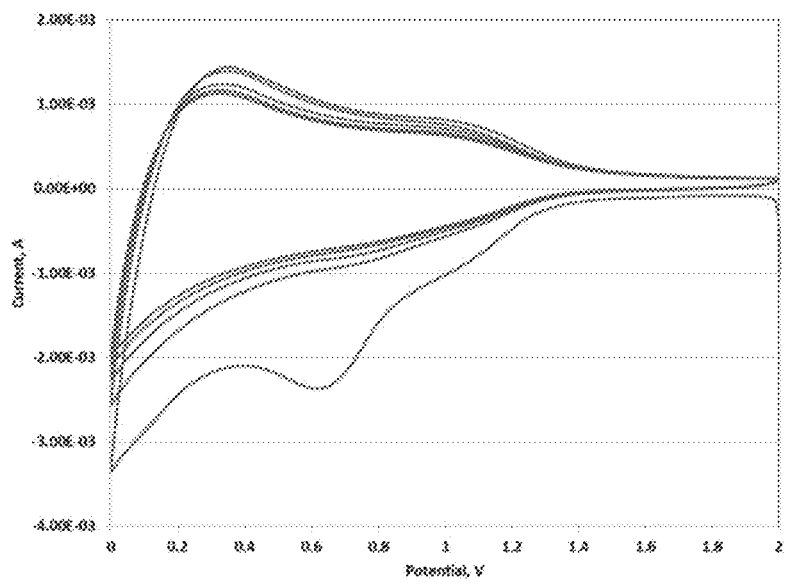

FIG. 3B is a graph showing cyclic voltammetry measured at the anode of a lithium ion capacitor cycled at a temperature of about 65° C., where the lithium ion capacitor included an electrolyte having the following composition: 1.2 Molar (M) $LiPF_6$ in EC-PC-DEC solvent and 2 weight % VC. FIG. 3B shows the performance of a capacitor similar to that as FIGS. 2 and 3A, for example, where the electrolyte included the same ratios of EC-PC-DEC solvent as the electrolyte of FIG. 3A, but with a higher percentage of electrolyte additive. The y-axis shows current, measured in amperes (A), and the x-axis shows potential, measured in Volts (V). On comparison of the curves of FIGS. 2, 3A and 3B, FIG. 2 (no additive) shows more variation between cycles than FIG. 3B (2% VC additive), which shows more variation between cycles compared to that of FIG. 3A (1% VC additive).

Figure 4:
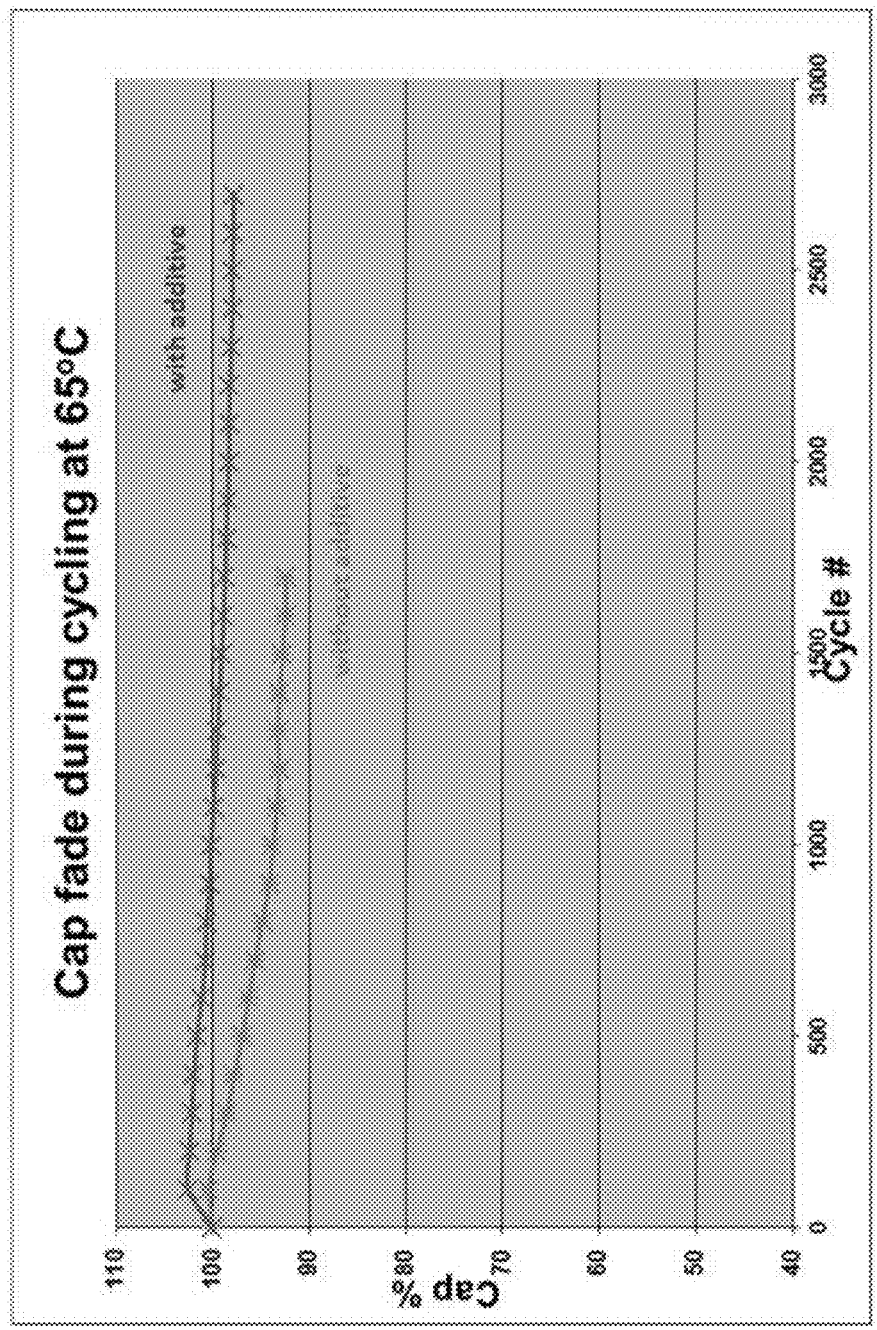
FIG. 4 shows cycling performance of a lithium ion capacitor with an electrolyte comprising 1 weight % VC as compared to that of a lithium ion capacitor with an electrolyte without VC.

FIG. 4 shows life cycle performance of a lithium ion capacitor having an electrolyte which included 1 weight % VC (similar to that shown in FIG. 3A), as compared to that of a lithium ion capacitor with an electrolyte which did not include the VC additive (similar to that shown in FIG. 2). The graph shows on the x-axis the number of cycles, and on the y-axis the capacitance value as a percentage of the initial capacitor capacitance value. The graph shows capacitance fade performance of the respective capacitors, expressed as a percentage of the initial capacitance, after a number of charge and discharge cycles. The capacitors were cycled at a temperature of about 65° C. The electrolyte in the capacitor comprising the VC had the following composition: 1.2 Molar (M) $LiPF_6$ in EC-PC-DEC solvent and 1 weight % VC. The electrolyte in the capacitor without the VC had the following composition: 1.2 Molar (M) $LiPF_6$ in EC-PC-DEC solvent. The two electrolytes included the same ratios of EC-PC-DEC solvent. As shown in FIG. 4, the lithium ion capacitor with VC electrolyte additive demonstrated improved life cycle performance, for example by demonstrating a decreased capacitance fade performance after a number of charge and discharge cycles. Specifically, the capacitor including 1% VC electrolyte additive retained more than 95% of its initial capacitance after 1500 cycles, while the capacitor not including an electrolyte additive retained less than 95% of its initial capacitance after 1500 cycles.

Figures 5A, 5B:
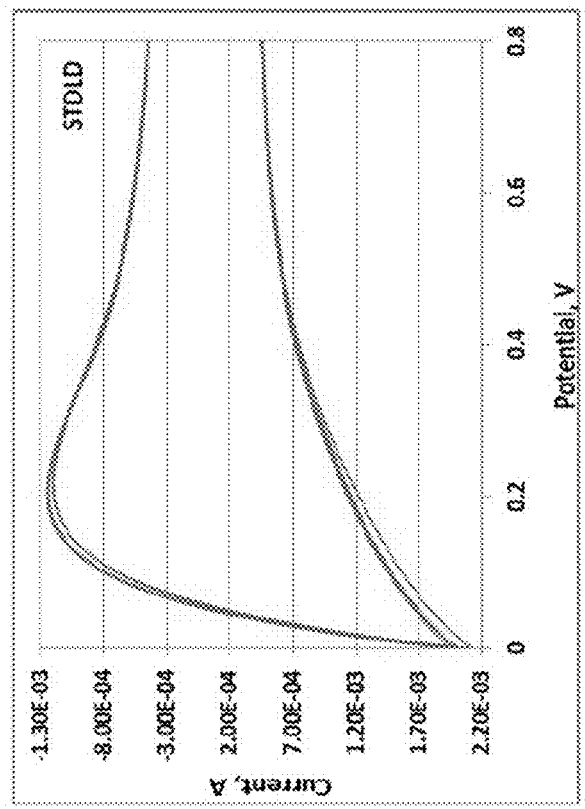
FIGS. 5A and 5B are graphs showing cyclic voltammetry curves of anodes of lithium ion capacitors comprising an EC (ethylene carbonate)-PC (propylene carbonate)-DEC (diethylcarbonate) containing electrolyte without or with 2 weight % VC, respectively.

FIGS. 5A and 5B are graphs showing cyclic voltammetry curves comparing performance of anodes of lithium ion capacitors comprising electrolyte with and without VC additive. The y-axes show current, measured in amperes (A), and the x-axes show potential, measured in Volts (V). FIG. 5A is a graph showing cyclic voltammetry measured at the anode of a lithium ion capacitor with an electrolyte having the following composition: 1.2 Molar (M) $LiPF_6$ in EC-PC-DEC solvent, where the volumetric ratio of the EC-PC-DEC is 3:1:4. FIG. 5B is a graph showing cyclic voltammetry measured at the anode of a lithium ion capacitor with an electrolyte having the following composition: 1.2 Molar (M) $LiPF_6$ in EC-PC-DEC solvent and 2 weight % VC, where the volumetric ratio of the EC-PC-DEC is 3:1:4. The curves of the FIG. 5B (2% VC additive) graph show less variation between cycles compared with the graph of FIG. 5A (no additive).

Figure 6A:
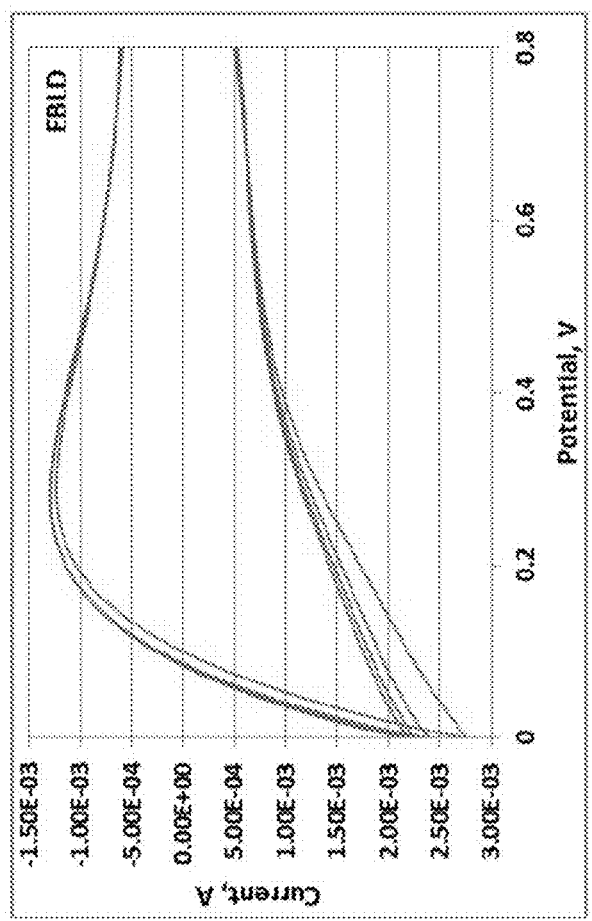
FIGS. 6A and 6B are graphs showing cyclic voltammetry curves of anodes of lithium ion capacitors comprising an EC-DEC-DMC (dimethylcarbonate)-EB (ethyl butyrate) containing electrolyte without or with 2 weight % VC, respectively.
Figure 6B:
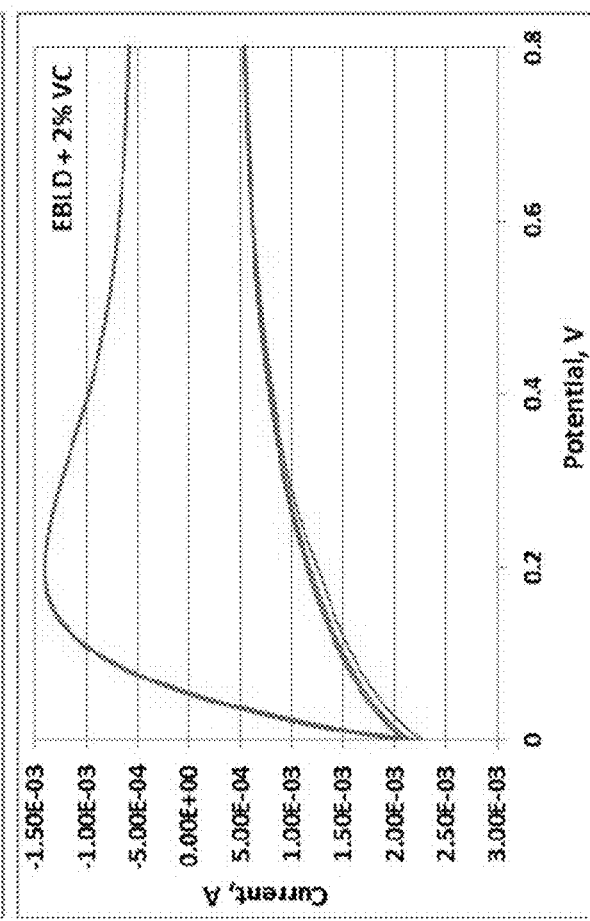

FIGS. 6A and 6B are graphs showing cyclic voltammetry curves comparing performance of anodes of lithium ion capacitors comprising electrolyte with and without VC. The y-axes show current, measured in amperes (A), and the x-axes show potential, measured in Volts (V). FIG. 6A is a graph showing cyclic voltammetry measured at the anode of a lithium ion capacitor with an electrolyte having the following composition: 1.0 Molar (M) $LiPF_6$ in EC-DEC-DMC-EB solvent, where the volumetric ratio of the EC-DEC-DMC-EB is 1:1:1:1. FIG. 6B is a graph showing cyclic voltammetry measured at the anode of a lithium ion capacitor with an electrolyte having the following composition: 1.0 Molar (M) $LiPF_6$ in EC-DEC-DMC-EB solvent, where the volumetric ratio of the EC-DEC-DMC-EB is 1:1:1:1, and 2 weight % VC additive. The curves of the FIG. 6B (2% VC additive) graph show less variation between cycles compared with the graph of FIG. 6A (no additive).

Figure 7A:
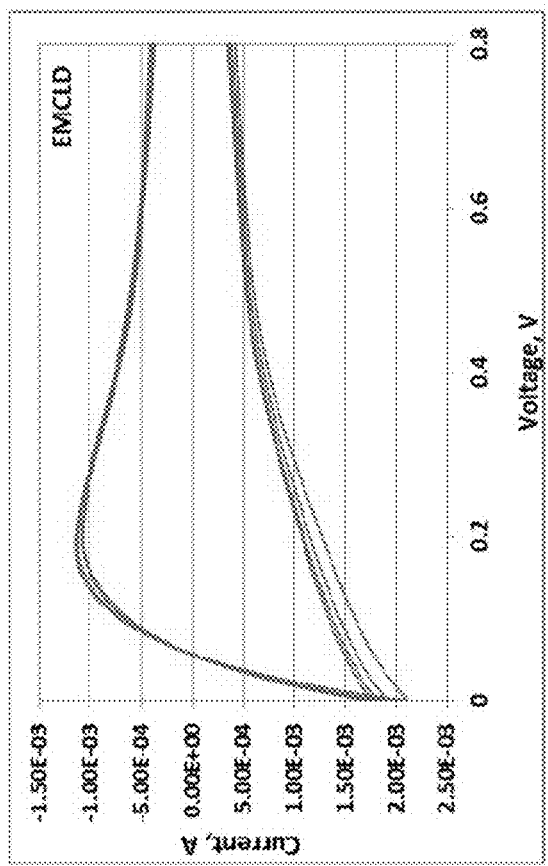
FIGS. 7A and 7B are graphs showing cyclic voltammetry curves of anodes of lithium ion capacitors comprising an EC-DEC-DMC-EMC (ethyl methyl carbonate) containing electrolyte without or with 2 weight % VC, respectively.
Figure 7B:
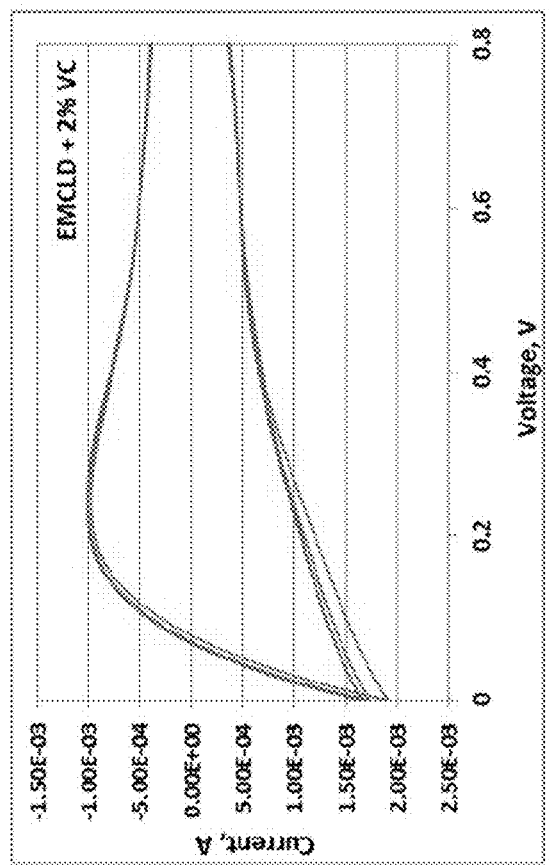

FIGS. 7A and 7B are graphs showing cyclic voltammetry curves comparing performance of anodes of lithium ion capacitors comprising electrolyte with and without VC. The y-axes show current, measured in amperes (A), and the x-axes show potential, measured in Volts (V). FIG. 7A is a graph showing cyclic voltammetry measured at the anode of a lithium ion capacitor with an electrolyte having the following composition: 1.0 Molar (M) $LiPF_6$ in EC-DEC-DMC-EMC solvent, where the volumetric ratio of EC-DEC-DMC-EMC is 1:1:1:2. FIG. 7B is a graph showing cyclic voltammetry measured at the anode of a lithium ion capacitor with an electrolyte having the following composition, 1.0 Molar (M) $LiPF_6$ in EC-DEC-DMC-EMC solvent and 2 weight % VC, where the volumetric ratio of EC-DEC-DMC-EMC is 1:1:1:2. The curves of the FIG. 7B (2% VC additive) graph show less variation between cycles compared with the graph of FIG. 7A (no additive).

Figures 8A, 8B, 8C, 8D:
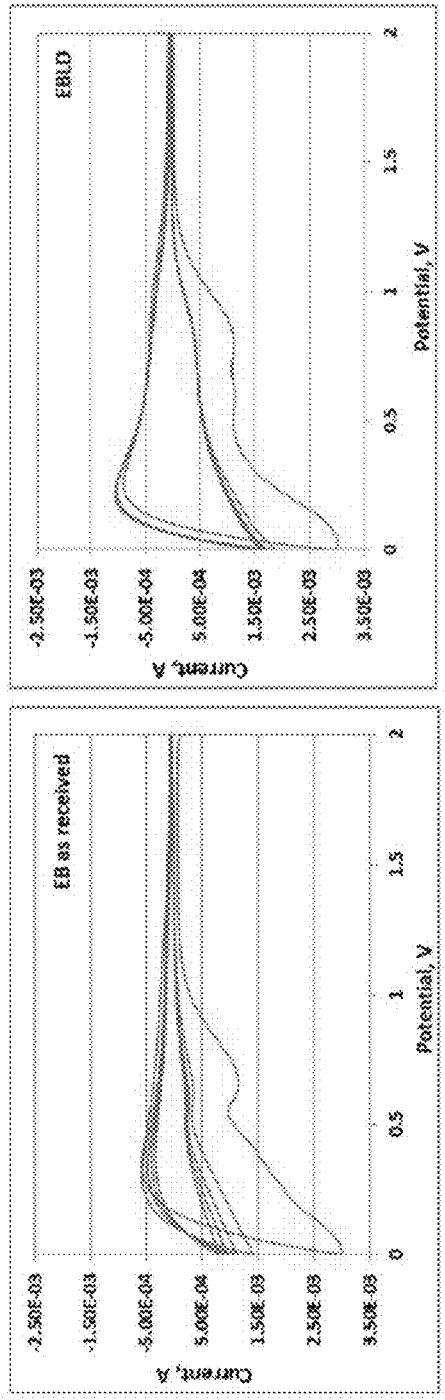
FIGS. 8A-8D are graphs showing cyclic voltammetry curves of anodes of lithium ion capacitors comprising an EC-DEC-DMC-EB containing electrolyte, as received and without dimethylacetamide (DMAc), as received and with 2 weight % dimethylacetamide (DMAc), purified and without DMAc, and purified and with 2 weight % DMAc, respectively.

FIGS. 8A-8D are graphs showing cyclic voltammetry curves comparing performance of anodes of lithium ion capacitors comprising electrolyte with and without DMAc, and with and without purifying the electrolyte. The y-axes show current, measured in amperes (A), and the x-axes show potential, measured in Volts (V). FIG. 8A is a graph showing cyclic voltammetry measured at the anode of a lithium ion capacitor with an electrolyte having the following composition, as received (i.e., the electrolyte was unpurified): 1.0 Molar (M) $LiPF_6$ in EC-DEC-DMC-EB solvent, where the volumetric ratio of the EC-DEC-DMC-EMC is 1:1:1:1. FIG. 8B is a graph showing cyclic voltammetry measured at the anode of a lithium ion capacitor with an electrolyte having the following composition, as received (i.e., the electrolyte was unpurified): 1.0 Molar (M) $LiPF_6$ in EC-DEC-DMC-EB solvent and 2 weight % DMAc, where the volumetric ratio of the EC-DEC-DMC-EB is 1:1:1:1. FIG. 8C shows cyclic voltammetry measured at the anode of a lithium ion capacitor with a purified electrolyte having the same nominal composition as that shown in FIG. 8A. FIG. 8D shows cyclic voltammetry measured at the anode of a lithium ion capacitor with a purified electrolyte having the same nominal composition as that shown in FIG. 8B. The curves of the FIG. 8D (2% DMAc additive and purified electrolyte) graph show less variation between cycles compared with the graph of any of FIG. 8A, 8B, or 8C (no additive and/or unpurified electrolyte). As used herein, "purified" electrolyte means electrolyte which has undergone a purification process such that the purified electrolyte comprises less than 10 weight % of impurities, such as water. The purified solvents were generally characterized by a lower acid content and lower moisture than the unpurified solvents.

FIGS. 9A-9D are graphs showing cyclic voltammetry curves comparing performance of anodes of lithium ion capacitors comprising electrolyte with and without DMAc, and with and without purifying the electrolyte. The y-axes show current, measured in amperes (A), and the x-axes show potential, measured in Volts (V). FIG. 9A is a graph showing cyclic voltammetry measured at the anode of a lithium ion capacitor with an electrolyte having the following composition, as received (i.e., the electrolyte was unpurified): 1.0 Molar (M) $LiPF_6$ in EC-DEC-DMC-EMC solvent, where the volumetric ratio of the EC-DEC-DMC-EMC is 1:1:1:2. FIG. 9B is a graph showing cyclic voltammetry measured at the anode of a lithium ion capacitor with an electrolyte having the following composition, as received (i.e., the electrolyte was unpurified): 1.0 Molar (M) $LiPF_6$ in EC-DEC-DMC-EMC solvent and 2 weight % DMAc, where the volumetric ratio of the EC-DEC-DMC-EMC is 1:1:1:2. FIG. 9C shows cyclic voltammetry measured at the anode of a lithium ion capacitor with a purified electrolyte having the same nominal composition as that shown in FIG. 9A. FIG. 9D shows cyclic voltammetry measured at the anode of a lithium ion capacitor with a purified electrolyte having the same nominal composition as that shown in FIG. 9B. The curves of the FIG. 9D (2% DMAc additive and purified electrolyte) graph show less variation between cycles compared with the graph of any of FIG. 9A, 9B, or 9C (no additive and/or unpurified electrolyte).

Figures 10A, 10B:
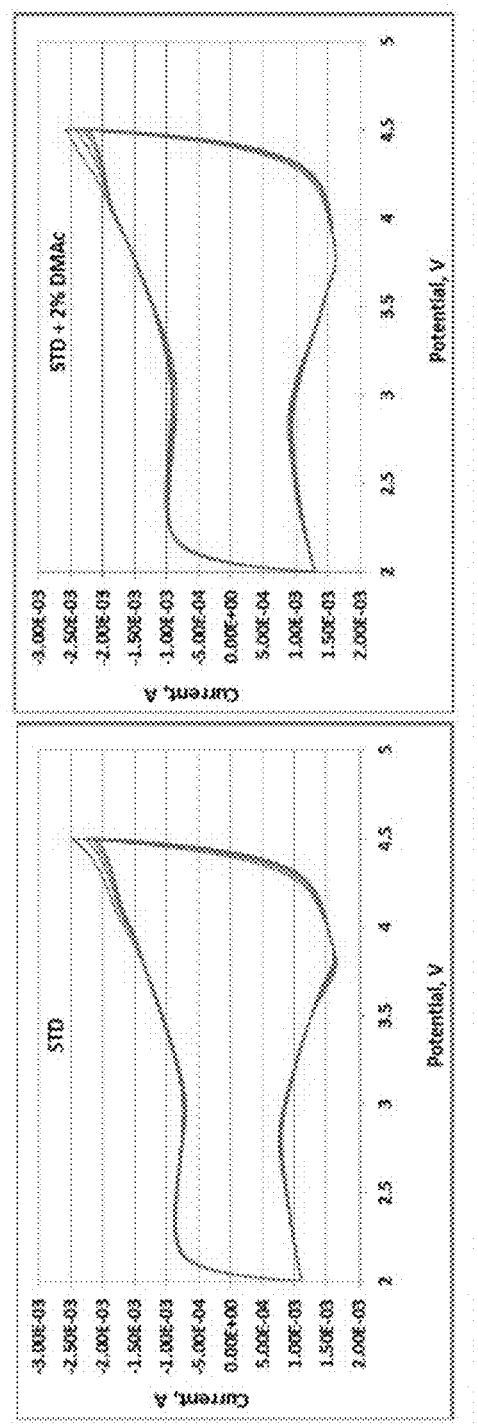
FIGS. 10A and 10B are graphs showing cyclic voltammetry curves of cathodes of lithium ion capacitors comprising an EC-PC-DEC containing electrolyte without or with 2 weight % DMAc, respectively.

FIGS. 10A and 10B are graphs showing cyclic voltammetry curves comparing performance of cathodes of lithium ion capacitors comprising electrolyte with and without DMAc. The y-axes show current, measured in amperes (A), and the x-axes show potential, measured in Volts (V). FIG. 10A is a graph showing cyclic voltammetry measured at the cathode of a lithium ion capacitor with an electrolyte having the following composition: 1.2 Molar (M) $LiPF_6$ in EC-PC-DEC solvent, where the volumetric ratio of the EC-PC-DEC is 3:1:4. FIG. 10B is a graph showing cyclic voltammetry measured at the cathode of a lithium ion capacitor with an electrolyte having the following composition: 1.2 Molar (M) $LiPF_6$ in EC-PC-DEC solvent and 2 weight % DMAc, where the volumetric ratio of the EC-PC-DEC is 3:1:4. The curves in the graph of FIG. 10A show increased current between 3.7 V and 4 V on the cycles on the lower portion of the graph, compared with the graph of FIG. 10B. Thus, the cathode of FIG. 10A (no additive) demonstrates additional unwanted electrolyte reactions compared to the cathode of FIG. 10B (2% DMAc additive).

Figures 11A, 11B:
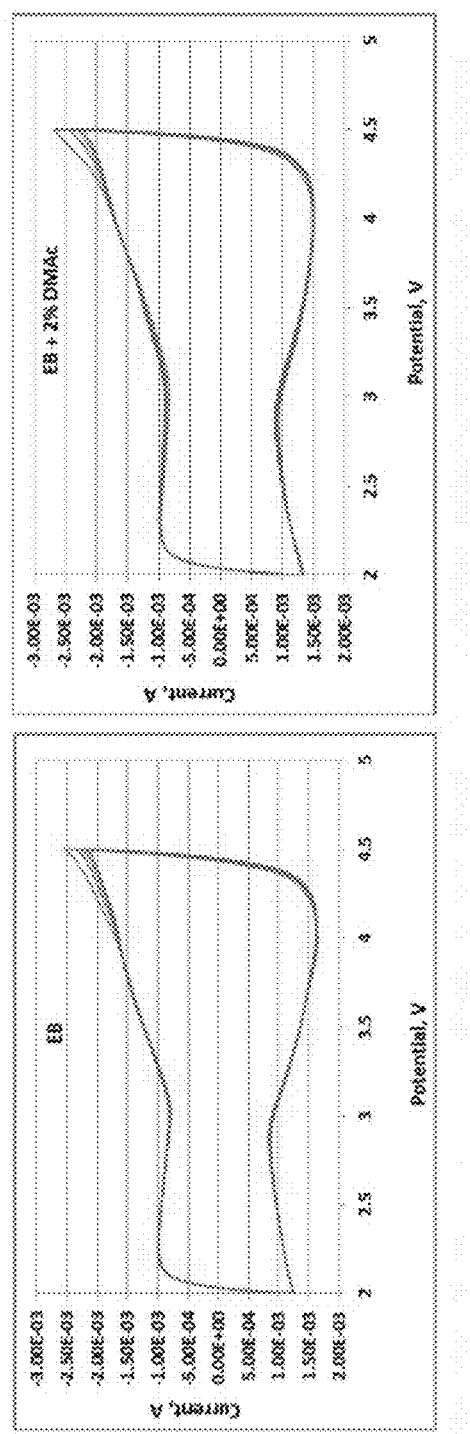
FIGS. 11A and 11B are graphs showing cyclic voltammetry curves of cathodes of lithium ion capacitors comprising an EC-DEC-DMC-EB containing electrolyte without or with 2 weight % DMAc, respectively.

FIGS. 11A and 11B are graphs showing cyclic voltammetry curves comparing performance of cathodes of lithium ion capacitors comprising electrolyte with and without DMAc. The y-axes show current, measured in amperes (A), and the x-axes show potential, measured in Volts (V). FIG. 11A is a graph showing cyclic voltammetry measured at the cathode of a lithium ion capacitor with an electrolyte having the following composition: 1.0 Molar (M) $LiPF_6$ in EC-DEC-DMC-EB solvent, where the volumetric ratio of the EC-DEC-DMC-EB is 1:1:1:1. FIG. 11B is a graph showing cyclic voltammetry measured at the cathode of a lithium ion capacitor with an electrolyte having the following composition: 1.0 Molar (M) $LiPF_6$ in EC-DEC-DMC-EB solvent and 2 weight % DMAc, where the volumetric ratio of the EC-DEC-DMC-EB is 1:1:1:1. The curves in the graph of FIG. 11A show increased current between 3.7 V and 4 V on the cycles on the lower portion of the graph, compared with the graph of FIG. 11B. Thus, the cathode of FIG. 11A (no additive) demonstrates additional unwanted electrolyte reactions compared to the cathode of FIG. 11B (2% DMAc additive).

Figures 12A, 12B:
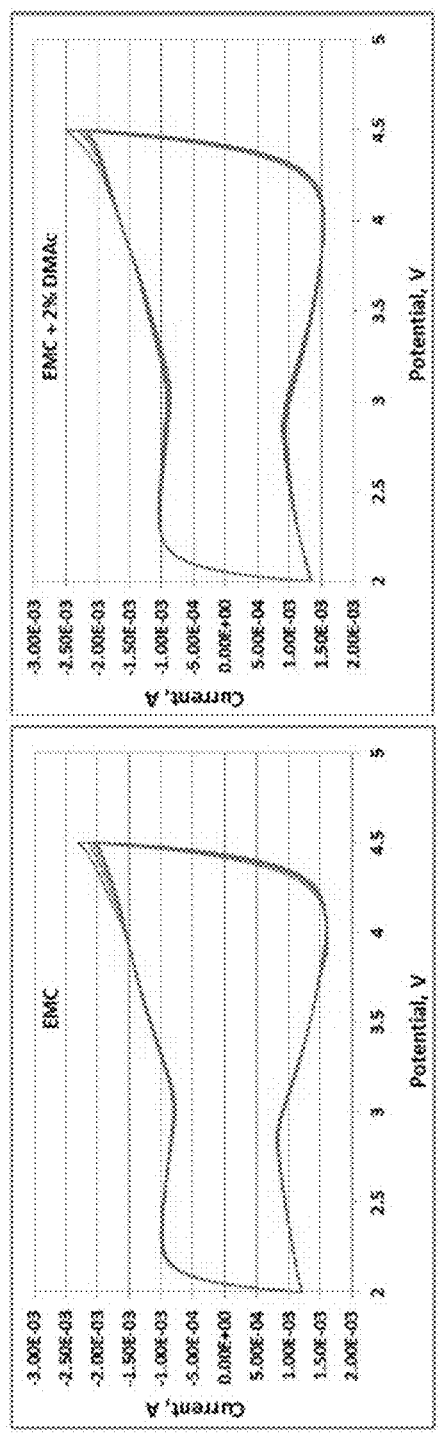
FIGS. 12A and 12B are graphs showing cyclic voltammetry curves of cathodes of lithium ion capacitors comprising an EC-DEC-DMC-EMC containing electrolyte without or with 2 weight % DMAc, respectively.

FIGS. 12A and 12B are graphs showing cyclic voltammetry curves comparing performance of cathodes of lithium ion capacitors comprising electrolyte with and without DMAc. The y-axes show current, measured in amperes (A), and the x-axes show potential, measured in Volts (V). FIG. 12A is a graph showing cyclic voltammetry measured at the cathode of a lithium ion capacitor with an electrolyte having the following composition: 1.0 Molar (M) $LiPF_6$ in EC-DEC-DMC-EMC solvent, where the volumetric ratio of the EC-DEC-DMC-EMC is 1:1:1:2. FIG. 12B is a graph showing cyclic voltammetry measured at the cathode of a lithium ion capacitor with an electrolyte having the following composition: 1.0 Molar (M) $LiPF_6$ in EC-DEC-DMC-EMC solvent and 2 weight % DMAc, where the volumetric ratio of the EC-DEC-DMC-EMC is 1:1:1:2. The curves in the graph of FIG. 12A show increased current between 3.7 V and 4 V on the cycles on the lower portion of the graph, compared with the graph of FIG. 12B. Thus, the cathode of FIG. 12A (no additive) demonstrates additional unwanted electrolyte reactions compared to the cathode of FIG. 12B (2% DMAc additive).

FIG. 13 is a table listing usable energy density and usable power density of lithium ion capacitors comprising one or more multifunctional additives as described herein. The energy density is shown in watt-hour/kilogram (Wh/kg), and the power density is shown in kilowatt/kilogram (kW/kg). As shown, "State of the Art" refers to a capacitor known in the art and having typical energy and power density. As shown, "product goal" refers to a capacitor that might meet certain design benchmarks for commercial implementation. As shown, "baseline LiC" refers to a capacitor in which the electrolyte did not include an additive provided herein. As shown, "250 F LiC", refers to a capacitor having a capacitance of 250 F and including an electrolyte additive provided herein. As shown, "lab cell" refers to a 15-20 F capacitance capacitor including an electrolyte additive provided herein. On comparison of the information shown in the table, it is understood that higher energy density and power density (compared to that of state of the art LIC) were observed in the "250 F LIC" and "lab LIC" cells in which an electrolyte additive was included.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above.

The headings provided herein, if any, are for convenience only and do not necessarily affect the scope or meaning of the devices and methods disclosed herein.

What is claimed is:

1. An energy storage device comprising:
   a cathode;
   an anode;
   a separator between the cathode and the anode; and
   an electrolyte comprising a solvent, a lithium salt, and one or more additives;
   wherein the electrolyte comprises each of the one or more additives in about 0.5 wt % to about 5 wt %; and
   wherein the solvent comprises EC (ethylene carbonate)/DEC (diethylcarbonate)/DMC (dimethylcarbonate)/EB (ethyl butyrate) in a ratio of about 1:1:1:1 by volume, EC/EMC/MP (methyl propionate) in a ratio of about 1:1:8 by volume, EC/DEC/DMC/EMC in a ratio of about 1:1:1:2 by volume, or EC/DMC/EB in a ratio of about 1:1:1 by volume.

2. The energy storage device of claim 1, wherein the one or more additives is selected from the group consisting of an anode passivation film forming agent, a cathode protection and overcharge protection agent, and an electrolyte stabilizer, and combinations thereof.

3. The energy storage device of claim 1, wherein the solvent comprises an ester selected from the group consisting of MP, EB, MB (methyl butyrate), EA (ethyl acetate), and combinations thereof.

4. The energy storage device of claim 1, wherein the lithium salt is $LiPF_6$.

5. The energy storage device of claim 4, wherein the $LiPF_6$ is present in the electrolyte in a concentration of about 0.8 to 1.4 M.

6. The energy storage device of claim 4, wherein the $LiPF_6$ is present in the electrolyte in a concentration of about 0.6 to 0.95 M.

7. The energy storage device of claim 1, wherein the energy storage device is a battery.

8. A method for fabricating an energy storage device comprising:
   providing a cathode;
   providing an anode;
   placing a separator between the cathode and the anode;
   inserting the cathode, the anode, and the separator into a housing; and
   adding an electrolyte to the housing, and contacting the electrolyte with the cathode and the anode;
   wherein the electrolyte comprises a solvent, a lithium salt, and one or more additives;
   wherein the electrolyte comprises each of the one or more additives in about 0.5 wt % to about 5 wt %; and
   wherein the solvent comprises EC (ethylene carbonate)/DEC (diethylcarbonate)/DMC (dimethylcarbonate)/EB (ethyl butyrate) in a ratio of about 1:1:1:1 by volume, EC/EMC/MP (methyl propionate) in a ratio of about 1:1:8 by volume, EC/DEC/DMC/EMC in a ratio of about 1:1:1:2 by volume, or EC/DMC/EB in a ratio of about 1:1:1 by volume.

9. The method of claim 8, wherein the one or more additives is selected from the group consisting of vinylene carbonate (VC), vinyl ethylene carbonate (VEC), a hydro fluorinated ether ethylene carbonate (HFEEC), dimethyl acetamide (DMAc), a hydro fluorinated ether (HFE), hydro fluorinated ether branched cyclic carbonate, and a fluorinated ethylene carbonate (FEC), and combinations thereof.

10. The method of claim 8, wherein the anode comprises a current collector and an electrode film formed using a dry process from a dry particles mixture.

11. The method of claim 8, wherein the solvent comprises an ester selected from the group consisting of MP, EB, MB (methyl butyrate), EA (ethyl acetate), and combinations thereof.

12. The method of claim 8, wherein the lithium salt is $LiPF_6$.

13. The method of claim 12, wherein the $LiPF_6$ is present in the electrolyte in a concentration of about 0.8 to 1.4 M.

14. The method of claim 12, wherein the $LiPF_6$ is present in the electrolyte in a concentration of about 0.6 to 0.95 M.

15. A method of claim 8, wherein the energy storage device is a battery.

16. The energy storage device of claim 1, wherein the one or more additives is selected from the group consisting of vinylene carbonate (VC), vinyl ethylene carbonate (VEC), a hydro fluorinated ether ethylene carbonate (HFEEC), dimethyl acetamide (DMAc), a hydro fluorinated ether (HFE), hydro fluorinated ether branched cyclic carbonate, and a fluorinated ethylene carbonate (FEC), and combinations thereof.

17. The method of claim 8, wherein the one or more additives is selected from the group consisting of an anode passivation film forming agent, a cathode protection and overcharge protection agent, and an electrolyte stabilizer, and combinations thereof.

\* \* \* \* \*